INVENTOR
E.A.J. MARCATILI
BY
Sylvan Sherman
ATTORNEY

United States Patent Office 3,241,085
Patented Mar. 15, 1966

3,241,085
HIGH POWER OPTICAL MASER USING A CIRCULAR ELLIPSOIDAL RESONANT CAVITY
Enrique A. J. Marcatili, Fair Haven, N.J., assignor to Bell Telephone Laboratories, Incorporated, New York, N.Y., a corporation of New York
Filed Mar. 23, 1962, Ser. No. 181,872
13 Claims. (Cl. 331—94.5)

This invention relates to devices for generating and amplifying electromagnetic wave energy and, in particular, to maser oscillations and amplifiers. The invention is primarily directed to masers operating in the infrared, visible and ultraviolet frequency ranges, hereinafter to be referred to collectively as the optical range of frequencies.

A. L. Schawlow and C. H. Townes (Physical Review, volume 112, 1958, page 1940) have proposed that coherent amplification of electromagnetic waves could be achieved in the optical regions of the frequency spectrum by maser techniques. Since it is necessary, at such frequencies, to use multimode resonators to achieve reasonable dimensions and high Q, they have suggested that two, plane-parallel, reflecting surfaces (known as a Fabry-Perot interferometer, or etalon), be used as a resonator.

In an article entitled "Confocal Multimode Resonator for Millimeter Through Optical Wavelength Masers" by G. D. Boyd and J. P. Gordon, published in the March 1961 issue of the Bell System Technical Journal, pages 489 to 508, it is pointed out that substantial improvements can be obtained in maser generators and amplifiers by using curved reflecting surfaces and, in particular, confocal reflectors, in place of the plane reflectors.

While substantial improvement is realized using confocal mirrors, the cross section of the beam produced by such a maser is still only a small part of the cross section of the maser material and mirrors. As a result, devices of this type are low powered and are inefficient in their use of the active maser material.

It is, therefore, an object of this invention to increase the power output of maser oscillators and amplifiers.

It is a more specific object of this invention to increase the power output of maser oscillators and amplifiers by more efficiently utilizing the maser material.

In accordance with the principles of the invention, the maser cavity comprises a section of a prolate spheroid. More specifically, the reflector defining the maser cavity is a circular mirror whose surface is part of an ellipsoid of revolution. By making the distance between of foci equal to the minor axis of the ellipsoid, diametrically opposite sides of the mirror are, in addition, confocal. The invention, thus, incorporates all the advantages of the confocal mirrors, as well as making more efficient use of the maser material.

The maser material can either fully occupy the volume within the circular cavity or, if occupying only a portion of such volume, can be in the shape of a disk whose end surfaces are at the Brewster angle thus making the orientation of the maser material with respect to the mirror uncritical.

In one specific embodiment of the invention, the maser material completely fills the volume within the cavity. In this embodiment the radiant energy is emitted radially around the entire circumference of the device. In a second embodiment of the invention, the maser material is in the form of an annular disk whose center portion is free of maser materials. A reflective, 45 degree cone is inserted within the disk to reflect a portion of the oscillatory waves. In this latter arrangement, the radiant energy is emitted axially. The output power is controlled by varying the amount of penetration of the cone within the maser cavity.

These and other objects and advantages, the nature of the present invention, and its various features, will appear more fully upon consideration of the various illustrative embodiments now to be described in detail in connection with the accompanying drawings in which.

Figure 1:
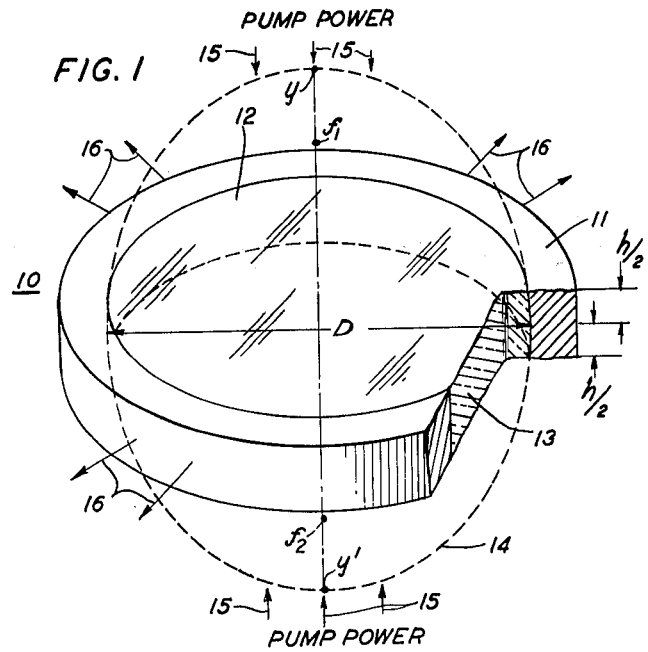
FIG. 1 shows in perspective a circular maser cavity in accordance with the invention.

Referring more specifically to FIG. 1, there is illustrated a circular maser cavity 10 in accordance with the teachings of the invention. The cavity comprises a ring 11 of material that is transparent to electromagnetic radiation over the frequency range of operation. The inner surface 12 of ring 11, however, is coated with a suitable material to render it partially reflective over said range of operating frequencies. For operation in the optical portion of the frequency spectrum, for example, the surface 12 can be partially silvered to produce the desired reflectivity. Surface 12 is, in addition, shaped and proportioned in a manner to be explained in greater detail hereinafter.

Located within the volume defined by ring 11 is a suitable maser material 13. It is characteristic of a maser that it employs a medium in which there can be established, at least intermittently, a non-equilibrium population distribution in a pair of spaced energy levels of its energy level system. In particular, the population of the higher of the selected energy levels is made larger than that of a lower energy level. It is usual to describe a medium which is in such a state of non-equilibrium as exhibiting a negative temperature. If there is then applied to a medium which is in a negative temperature state, a signal at a frequency which satisfies Planck's law with respect to the two energy levels which are in non-equilibrium, the applied signal will stimulate from the medium the emission of radiation at the signal frequency and the signal will be amplified. Alternatively, by the selective regeneration within the maser material of a component of the energy spontaneously emitted when particles "fall" from an upper to a lower energy level, coherent oscillations can be induced and sustained.

The maser material 13 is selected such that its radiative energy level separation corresponds to a frequency within the range of interest. For the purposes of illustration, the range of interest is selected to be within the range of visible light for which a ruby material of a type described by R. J. Collins, D. F. Nelson, A. L. Schawlow, W. Bond, C. G. B. Garret and W. Kaiser, "Coherence, Narrowing, Directionality and Relaxation Oscillations in the Light Emission From Ruby," Physical Review Letters, May 1960, page 303, is advantageously used.

To achieve a population inversion, or a so-called negative temperature, and thereby to effect maser action, the material 13 is pumped by means of a suitable energy source (not shown) disposed above and below material 13. This is indicated symbolically by the arrows 15 directed towards material 13.

To selectively regenerate components of the energy spontaneously emitted by particles within the maser material in the manner contemplated by the invention, the surface 12 comprises a portion of an ellipsoid of revolution whose minor axis is equal to the inside diameter D of ring 11 as measured at the center of surface 12. Referring to FIG. 1, surface 12 is generated by rotating the ellipse 14 (whose minor axis is D and whose major axis is $yy'$) about its major axis. The portion of the ellipsoid defining surface 12 is symmetrical with respect to the plane generated by the minor axis of ellipse 14 and extends a distance $h/2$ on both sides thereof.

It can be shown, solving Maxwell's equations, that the diffraction losses for any particular cavity mode are minimized when the distance between foci $f_1$ and $f_2$ of ellipse 14 is equal to the minor axis D. This particular choice makes diametrically opposite portions of surface 12 confocal. For this specific condition, the radius of curvature at the center of surface 12 along any plane defined by the major and minor axes of the ellipsoid is equal to the minor axis. Thus, this radius of curvature is equal to the inside diameter D of ring 11. The radius of curvature at the center of surface 12 along the plane perpendicular to the major axis is equal to one-half the diameter D of ring 11.

In the embodiment of FIG. 1 energy components are induced in the maser material under the influence of the pumping field. Components that propagate in a radial direction are reflected by the surface 12, traverse the maser material in a radial direction and upon reaching a diametrically opposite side of the circular cavity are again reflected. Because of the ellipsoidal shape of the reflecting surface 12, the $TEM_{0n1}$ radially propagating mode has the least diffraction loss and, therefore, is the preferred mode; hence, the radially propagating $TEM_{0n1}$ waves are regenerated and oscillations are induced. In the $TEM_{mnp}$ designation, the first subscript "$m$" refers to the number of field inversions in the azimuthal direction; the second subscript "$n$" refers to the number of half periods in the radial direction; and the third subscript "$p$" refers to the number of field inversions in the direction of the major axis. The induced energy radiates radially from about the entire periphery of cavity 10 as indicated by arrows 16.

In a maser oscillator utilizing a rod of maser material located between confocal mirrors, the diameter $d$ of the beam that is produced is given by $$d = \sqrt{\frac{2\lambda l}{\pi}} \quad (1)$$

where:

$l$ is the distance between mirrors, and
$\lambda$ is the free space wavelength.

In the embodiment of FIG. 1, the output is a flat beam of height $d$ which is emitted radially about the periphery of the cavity.

The volume of maser material that is active in the rod maser is $$V_r = \frac{\pi}{4} d^2 l \quad (2)$$

For the embodiment of FIG. 1, the volume of active material is given by $$V_0 = \frac{\pi}{4} D^2 d \quad (3)$$

The ratio of volumes is proportional to the ratio of the available output power. Hence, $$\frac{V_0}{V_r} = \frac{P_0}{P_r} = \frac{D^2}{dl} \quad (4)$$

If the diameter D of the maser material is assumed equal to the length $l$ of the maser rod, $$\frac{P_0}{P_r} = \frac{D}{d} \quad (5)$$

For a circular maser having a diameter D equal to one meter, and a beam height $d$ equal to 0.8 mm., the power ratio is $$\frac{P_0}{P_r} = 1250$$

This means that the circular maser shown in FIG. 1 capable of producing over 1200 times the power available from a maser using a rod of maser material of comparable length.

In practice, the volume of maser material used is greater than that computed above. As pointed out by Boyd and Gordon, the minimum volume of material and the minimum height of the mirror are limited by the diffraction losses. Typically, the diffraction losses decrease as the volume of maser material and the diameter of the mirrors increase. However, volumetric increases beyond a certain point produce no substantial increase in operating efficiency since the reflection losses from the mirror surfaces become the limiting factor. In practice, therefore, the height $h$ of the mirror and the maser material are typically between $2d$ to $10d$.

The relative volume of maser material used in the circular and rod masers whose height and diameter, respectively, are ten times the beam diameter is in the ratio of 125 to 1. Hence, the relative increases in the ratio of output power to volume in the circular maser over the prior art rod type maser is in the order of 10 to 1.

Figure 2:
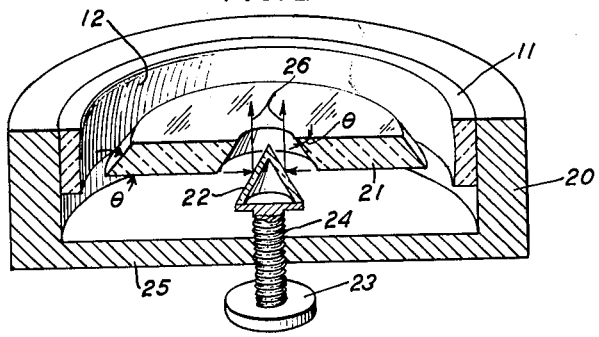
FIG. 2 shows in perspective a circular maser cavity including a reflective 45 degree cone.

As indicated above, the radiant energy is emitted radially around the entire periphery of the cavity 10. Such a device would have utility as a space beacon or as an omni-directional transmitter. In FIG. 2 there is illustrated in cross section a second embodiment of the invention in which the output energy is emitted axially as a unidirectional concentrated beam. In the embodiment of FIG. 2, the ring 11 defining the maser cavity is surrounded by a metallic cylinder 20. The ellipsoidal surface 12 is preferably made highly reflective so that all of the incident energy is reflected therefrom. Any energy that does penetrate surface 12 is either reflected from the sides of the metallic cylinder 20 or, alternatively, the inside surface of cylinder 20 can be made absorptive.

The maser material 21 is in the shape of an annular ring or disk whose axis is colinear with the major axis of the ellipsoidal surface 12. The inner and outer edges of the ring of maser material are beveled at the Brewster angle $\theta$. Means for supporting the maser material within the cavity have not been shown so as not to unduly clutter the figure.

Located below and partially penetrating the maser material is a reflective, 45 degree cone 22 whose axis is also colinearly aligned with the major axis of surface 12. Cone 22 is supported by means of a threaded shaft 23 which passes through and engages a threaded aperture 24 in the bottom surface 25 of cylinder 20. In operation, oscillations are induced in the maser material under the influence of a pumping field (not shown). With the cone 22 fully withdrawn from the maser material the oscillating energy is wholly confined within the maser cavity and no energy is emitted. As the cone is inserted within the material by rotating the shaft 23 in the appropriate direction, a portion of the oscillating waves impinge upon and are reflected by the reflective cone surface. The waves thus intercepted are emitted from the cavity in an axial direction as indicated by the arrows 26. By controlling the amount of penetration of cone 22 within the maser material, the amount of output from the maser can be varied. Suitable lenses, either optical or electrical, can then be utilized to shape the output beam in the required manner.

Figure 3:
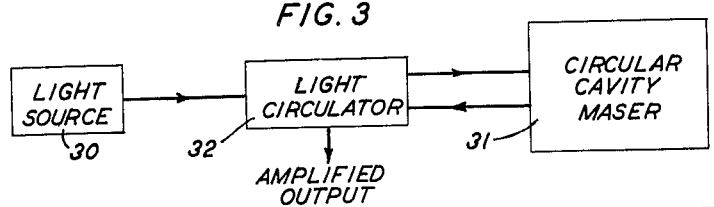
FIG. 3 shows in block diagram a system using a circular maser cavity as a light amplifier.

The embodiment of FIG. 2 has been described as an oscillator. However, by reducing the intensity of the pumping power below that necessary to produce oscillations, the device can be utilized as a maser amplifier. In FIG. 3 an arrangement for amplifying light is shown in block diagram. The arrangement comprises a light source 30 and a circular cavity maser amplifier 31. Disposed between source 30 and amplifier 31 is a light circulator 32 for diverting the amplified light leaving amplifier 31 away from the light source 30. Typically, circulator 32 comprises an input polarizer, a polarization separator of the type shown on page 492 of "Fundamentals of Optics," by F. A. Jenkins and H. E. White, and a Faraday rotator. The polarization separator passes the incident polarization established by the input polarizer which is then rotated 45 degrees by the Faraday rotator before entering the amplifier. The amplified output wave, polarized in the same direction, is passed through the Faraday rotator and rotated through an additional 45 degrees in the same sense as the incident wave for a total rotation of 90 degrees. This direction of polarization is not passed by the polarization separator but is, instead, reflected away from the signal source as indicated in the figure.

Heretofore the ring cavity 10 has been considered in connection with optical masers. However, the cavity can also be used at the lower microwave frequencies, particularly where large access areas are needed. For example, in the copending application of D. Marcuse, Serial No. 117,211, filed June 15, 1961, now Patent No. 3,139,589, there is described a gas beam maser operative at 88.6 kmc. per second. In this type of maser, a beam of gas is caused to pass through a signal cavity. Since a cavity of the type described hereinabove has a large access area (defined by the diameter D of ring 11) through which the gas can pass, large volumes of gas can be advantageously used. Typically, a ring cavity built in accordance with the principles of the invention and operating at 88.6 kmc. per second would have a diameter of the order of one-half a meter and a Q of the order of 100,000. Microwave energy can be coupled out of the cavity by way of an aperture in the cavity wall.

Thus, it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. In a maser:
   a circular cavity having a reflective inner surface;
   said surface being a portion of an ellipsoid of revolution having unequal major and minor axes and extending symmetrically about the plane of the minor axis of said ellipsoid;
   and a negative temperature medium located within the volume defined by said cavity.
2. The combination according to claim 1 wherein said minor axis is equal to the distance between the focal points of said ellipsoid.
3. In a maser:
   a circular cavity having a highly reflective inner surface;
   said surface being a portion of an ellipsoid of revolution and extending symmetrically about the plane of the minor axis of said ellipsoid;
   a negative temperature medium located within the volume defined by said cavity;
   means for extracting electromagnetic wave energy from said cavity comprising a reflective 45 degree cone whose axis is colinearly aligned with the major axis of said ellipsoid;
   and means for inserting said cone within said cavity.
4. The combination according to claim 3 wherein said minor axis is equal to the distance between the focal points of said ellipsoid.
5. In a maser operative over the optical portion of the frequency spectrum:
   a circular cavity having a reflective inner surface;
   said surface being a portion of an ellipsoid of revolution conforming substantially to a surface generated by rotating an ellipsoid about its major axis;
   said surface being symmetrical with respect to the plane of the minor axis of said ellipsoid;
   a negative temperature medium, which in the presence of pumping energy is capable of amplifying waves within said portion of the frequency spectrum by the stimulated emission of wave energy, located within the volume defined by said cavity;
   and means for applying pumping energy to said medium.
6. The combination according to claim 5 wherein said medium substantially fills the volume defined by said cavity.
7. The combination according to claim 5 wherein said medium is an annular ring whose axis is colinearly aligned with the major axis of said ellipsoidal surface.
8. The combination according to claim 5 wherein said pumping energy is sufficient to induce oscillations within said maser.
9. The combination according to claim 5 wherein said pumping energy is below the threshold of oscillations.
10. A maser cavity comprising:
    a circular reflector whose inner surface is a portion of an ellipsoid of revolution having unequal major and minor axes;
    said surface being symmetrical about the plane of the minor axis of said ellipsoid.
11. The cavity according to claim 1 wherein said surface is adapted to transmit a portion of the radiation incident thereupon and to reflect the remaining portion of said radiation.
12. The cavity according to claim 1 wherein said surface is substantially totally reflective.
13. A maser amplifier operative over the optical portion of the frequency spectrum comprising:
    a circular cavity having a reflective inner surface;
    said surface being a portion of an ellipsoid of revolution conforming substantially to a surface generated by rotating an ellipsoid about its major axis;
    said surface being symmetrical with respect to the plane of the minor axis of said ellipsoid;
    a negative temperature medium, which in the presence of pumping energy is capable of amplifying waves within said portion of the frequency spectrum by the stimulated emission of wave energy, located within the volume defined by said cavity;
    said medium being an annular ring whose axis is colinearly aligned with the major axis of said ellipsoidal surface;
    means for applying pumping energy to said medium;
    and means for extracting wave energy from said maser in a direction substantially parallel to said major axis comprising a reflective, 45 degree cone disposed within said cavity with the axis of said cone colinear with said major axis.

References Cited by the Examiner

UNITED STATES PATENTS 1,278,026  9/1918  Salto _____ 88—1

FOREIGN PATENTS 712,329  10/1941  Germany.

JEWELL H. PEDERSEN, *Primary Examiner.*